United States Patent Office 3,812,088
Patented May 21, 1974

3,812,088
POLYMERIZATION OF VINYL AROMATIC COMPOUNDS
Donald Alfred Bennett, Beaulieu, England, assignor to The International Synthetic Rubber Company Limited, Southampton, England
Filed Nov. 30, 1971, Ser. No. 203,292
Claims priority, application Great Britain, Dec. 10, 1970, 58,757/70
Int. Cl. C08f 7/02, 7/04
U.S. Cl. 260—93.5 R
24 Claims

ABSTRACT OF THE DISCLOSURE

A process for the anionic polymerization of at least one vinyl aromatic monomer selected from styrene and hydrocarbyl substituted styrenes comprising polymerizing the monomer in the presence of a catalyst comprising a metal of Group 1–A of the Periodic Table or a hydride or hydrocarbyl thereof characterized in that the feedstock for the polymerization is the hydrocarbon effluent of a dehydrogenation reaction comprising at least 5% by weight of said monomer and in that at least a proportion of the heat of polymerization is retained in the reaction mixture whereby the temperature of the mixture is caused to rise and is for at least part of the reaction time in excess of 100° C.

---

Figure 1:
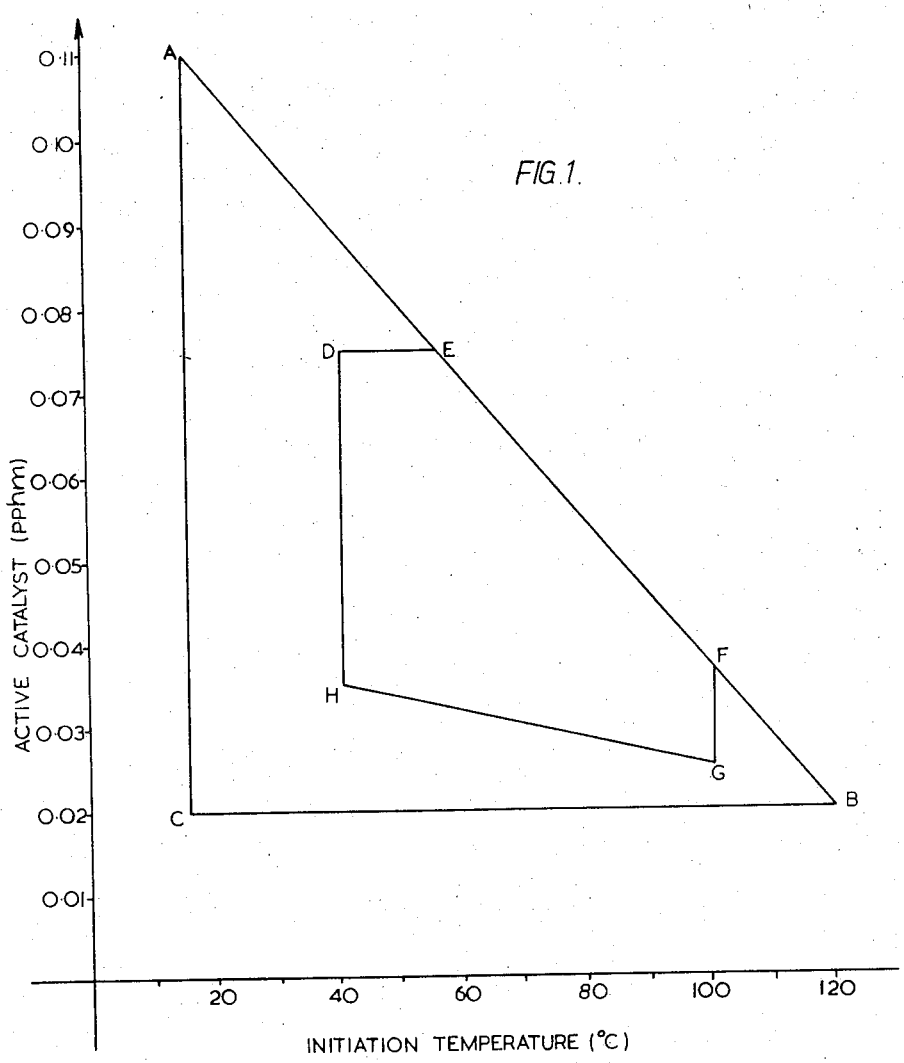

This invention relates to the polymerization of vinyl aromatic compounds.

Methods for polymerizing vinyl aromatic compounds, i.e. those containing a single vinyl group directly attached to an aromatic nucleus, which compounds may be substituted with e.g. halogen or hydrocarbyl groups, are well known. These methods including bulk, bead, or emulsion polymerizations using free radical catalysts and isothermal polymerization in hydrocarbon solution employing an anionic catalyst system such as lithium alkyl. In the preparation of vinyl aromatic polymers by such methods the monomer is generally required in a substantially pure form. The vinyl aromatic monomer is usually prepared by dehydrogenation of its alkyl aromatic precursor (e.g. styrene is prepared by dehydrogenation of ethyl benzene). Subsequent separation of the vinyl aromatic monomer from other dehydrogenation products and also unconverted precursor in the effluent of the reaction has generally been required.

In prior art processes the control of temperature plays an important part in the production of a satisfactory end product. Thus when using an anionic system in a solution polymerization, the temperature has been kept low, typically from 30° C. to 70° C., notwithstanding reduced reaction rates, to avoid undesirable decrease in the molecular weight of the polymer product and to avoid any other complications occurring when using high temperature e.g. low yield conversion. The deleterious effects of increasing the temperature in such anionic polymerizations have been described by E. W. Duck, M. N. Thornber and L. V. J. Saunders (Rubber and Plastics Age, 1964, vol. 45, pages 274 and 276).

For example, U.K. Specification No. 842,665, describes and claims a method of making polystyrene which comprises preparing a solution of styrene in an inert hydrocarbon having a boiling range close to that of styrene, polymerizing the styrene in said solution at a temperature in the range of about 40 to 100° C. in the presence of a dispersed sodium catalyst of small particle size, controlling the temperature in the polymerization step by boiling the solution at a controlled presure, removing sodium from the polymer solution and finally removing solvent from said solution. One embodiment of the process includes the step of preparing the styrene solution by dehydrogenating ethylbenzene contained in a $C_8$ aromatic stream obtained from hydroformed naphtha and substantially freeing the resulting solution of styrene monomer from tar and water.

We have now found that if, contrary to previous practice in the anionic polymerization of vinyl aromatic compounds, the temperature of the reaction mixture is allowed to rise in an uncontrolled manner to levels well above those previously considered practicable, it is possible to obtain useful products of high molecular weight. In particular more rapid production of high molecular weight vinyl aromatic polymers by anionically polymerizing the monomers unseparated from the effluent of a dehydrogenation reaction becomes feasible.

According to the present invention there is provided a process for the anionic polymerization of at least one vinyl aromatic monomer selected from styrene and hydrocarbyl substituted styrenes comprising polymerizing the monomer in the presence of a catalyst comprising a metal of Group 1–A of the Periodic Table or a hydride or hydrocarbyl thereof characterized in that the feedstock for the polymerization is the hydrocarbon effluent of a dehydrogenation reaction comprising at least 5% by weight of said monomer and in that at least a proportion of the heat of polymerization is retained is the reaction mixture whereby the temperature of the mixture is caused to rise and is for at least part of the reaction time in excess of 100° C.

Preferably 50% or more of the heat of polymerization is retained in the reaction mixture.

Also according to the present invention there is provided an anionic polymerization process, preferably a continuous process, as just described, in which at least 80% of the heat of reaction is retained in the reaction mixture. The reaction may be performed under substantially adiabatic conditions. Preferably a polymer is recovered having an inherent viscosity (measured under the conditions hereafter described) of at least 0.5.

The term inherent viscosity whenever used in this Specification refers to the inherent viscosity of an approximately 0.1% w./v. solution in laboratory grade toluene as determined in an Ostwald viscometer at 25° C.

In yet a further aspect of this invention there is provided an anionic polymerization process, which is preferably continuous, in which the temperature of the reaction mixture is in excess of 100° C. for at least half of the time of the polymerization reaction, in which the conversion of monomer to polymer is at least 80%, and in which a polymer having an inherent viscosity of at least 0.65 is recovered.

The increase in temperature ($\Delta t$) of the reaction mixture on reaction is primarily dependent on the heat of polymerization and the concentration of the vinyl aromatic compound, the other hydrocarbons in the mixture having a lesser effect.

The vinyl aromatic compound may be polymerized substantially in the form of the effluent of a dehydrogenation reaction. For instance in the case of styrene as monomer, the styrene is polymerized as a solution in ethyl benzene (generally also containing a small percentage of toluene, benzene and other homologues), which is obtained directly by the dehydrogenation of ethyl benzene or of an ethyl benzene/xylene mixture such as is produced in the hydroforming of naphtha. Thus no separation of the monomer from the hydrocarbon effluent of the dehydrogenation reaction is required before the effluent is employed as feedstock for the polymerization.

Likewise alpha methyl styrene may be obtained prior to separation as a mixture with isopropyl benzene and may be polymerized according to the invention in this form. The concentration of vinyl aromatic monomer in the dehydrogenation effluent may be 5% to e.g. 90% or more by weight, concentrations of 30% to 60% usually being obtained. It is important that the feedstock prior to polymerization is substantially free of air, oxygen and moisture and other impurities which react with the polymerization catalyst or otherwise interfere with the polymerization reaction. If necessary a separate purification stage may be required to remove such impurities, and references in this Specification to monomers substantially in the form of the effluent of a dehydrogenation reaction are intended to include effluents which have been subjected to such a purification stage. Excess catalyst over that required for polymerization may be used to react with the impurities but this is expensive and wasteful.

Polymerization is initiated by means of an anionic catalyst comprising a metal of Group 1–A of the Periodic Table, or a hydride or hydrocarbyl of such a metal. Examples of suitable metals are lithium, sodium and potassium. Lithium (and hydrides or hydrocarbyls, e.g. having 1 to 6 carbon atoms, thereof) are preferred. Examples of suitable hydrocarbyl radicals are alkyl (including cycloalkyl), aryl and aralkyl radicals. Particular metal hydrocarbyl catalysts are methyl lithium, ethyl lithium, butyl lithium, amyl lithium, sodium naphthalene, benzyl lithium and phenyl lithium. Lithium alkyls, especially lithium butyl, are preferred. The amount of catalyst required is generally 5 to 15 mmoles per litre of vinyl aromatic monomer, but may be as low as about 2.5 mmoles per litre. The catalyst may be employed in the form of a solution in a suitable solvent, e.g. hexane.

Thus in the case of a lithium butyl polymerization of styrene, the lithium butyl concentration is usually in the range 0.035 to 0.11 parts per hundred parts of styrene, the minimum practicable level being about 0.020 parts. These amounts refer to active catalyst i.e. catalyst actually used to initiate polymerization. Where impurities are present in the monomer feed, some catalyst is used up in scavenging reactions and is not therefore available to initiate polymerization.

In general the inherent viscosity of the final polymer varies in inverse proportion with the catalyst concentration. Thus by varying catalyst concentration and initiation temperature, polymers having a variety of inherent viscosities may be obtained. The inherent viscosity of the product is desirably at least 0.5, preferably 0.65 to 1.4.

The initiation temperature of the mixture is chosen such that a sustained polymerization rate is obtained when the mixture is contacted with the catalyst and in general temperatures above 120° C. are not required. Typically, initiation temperatures in the range 30° C. to 100° C., e.g. 40° C. to 90° C., preferably 40° C. to 70° C., are used, initiation temperatures below about 15° C. giving rise to very slow reaction. Generally some reduction in the inherent viscosity of the final polymer is obtained as the initiation temperature is increased and by this means some control of the inherent viscosity of the final polymer may be obtained.

Once polymerization commences, the temperature of the reaction mixture rises since a proportion, preferably 50% or more, of the heat of polymerization is retained in the reaction mixture. Desirably at least 80%, and more preferably substantially all, of the heat of polymerization is retained in the mixture. The heat of polymerization of a vinyl aromatic monomer may be measured experimentally and in the case of styrene, figures have been quoted ranging from 16.1 to 17.7 kcal. per mole depending on the method of determination used. 16.7 kcal. per mole is a generally accepted value and references herein to percentage figures of the heat of polymerization may be converted to absolute values using this figure for the conversion factor. Thus from knowing the temperature rise in any given reaction and the relevant specific heats of the components of the reaction mixture, the amount of heat retained in the reaction mixture and hence the proportion of the theoretical amount of heat produced may readily be calculated.

The temperature rise is such that the temperature of the reaction mixture is in excess of 100° C. for at least a part of the reaction time and preferably for at least half of the reaction time. Temperatures of for example 200° C. or more may be attained towards the end of the reaction. Preferably the reaction conditions are such that the polymerization may be completed rapidly. The reaction time is preferably less than 1 hour, more preferably 30 minutes or less. $\Delta t$ for the reaction mixture is preferably at least 100° C.

The product at the end of reaction is at a temperature of 100° C. or more, preferably 180° C. or more. At the preferred final temperatures of 180° or more, the polymer product is readily devolatilized without requiring the addition of the large quantities of heat which are required in devolatilization processes in which the polymer is prepared by conventional processes involving the use of much lower polymerization temperatures. A further advantage is that the product is molten and is thus in an ideal form for further processing, e.g. pelletizing or moulding.

As mentioned above, the inherent viscosity of the polymer obtained may be varied somewhat by varying the initiation temperature and active catalyst level. In general satisfactory results may be obtained by using an appropriate combination of these parameters within the area of ABC of the graph shown in FIG. 1 of the accompanying drawings. More specifically, products of commercially desirable inherent viscosity are most conveniently obtained by selecting the parameters to be within the area DEFGH of the graph.

The monomers used in the polymerization process of the present invention are styrene, and hydrocarbyl substituted styrenes, i.e. styrene substituted in the benzene nucleus or in the vinyl side-chain by a hydrocarbon group, e.g. a hydrocarbon group having 1 to 4 carbon atoms. Examples of suitable hydrocarbyl substituted styrenes are alpha methyl styrene, vinyl toluene, and homologues of such compounds. Styrene is commercially manufactured on a large scale by dehydrogenation of ethyl benzene as indicated above and the process of the present invention permits the production of commercially valuable styrene polymer without the need for expensive separation of the styrene from the ethyl benzene.

Figure 2:
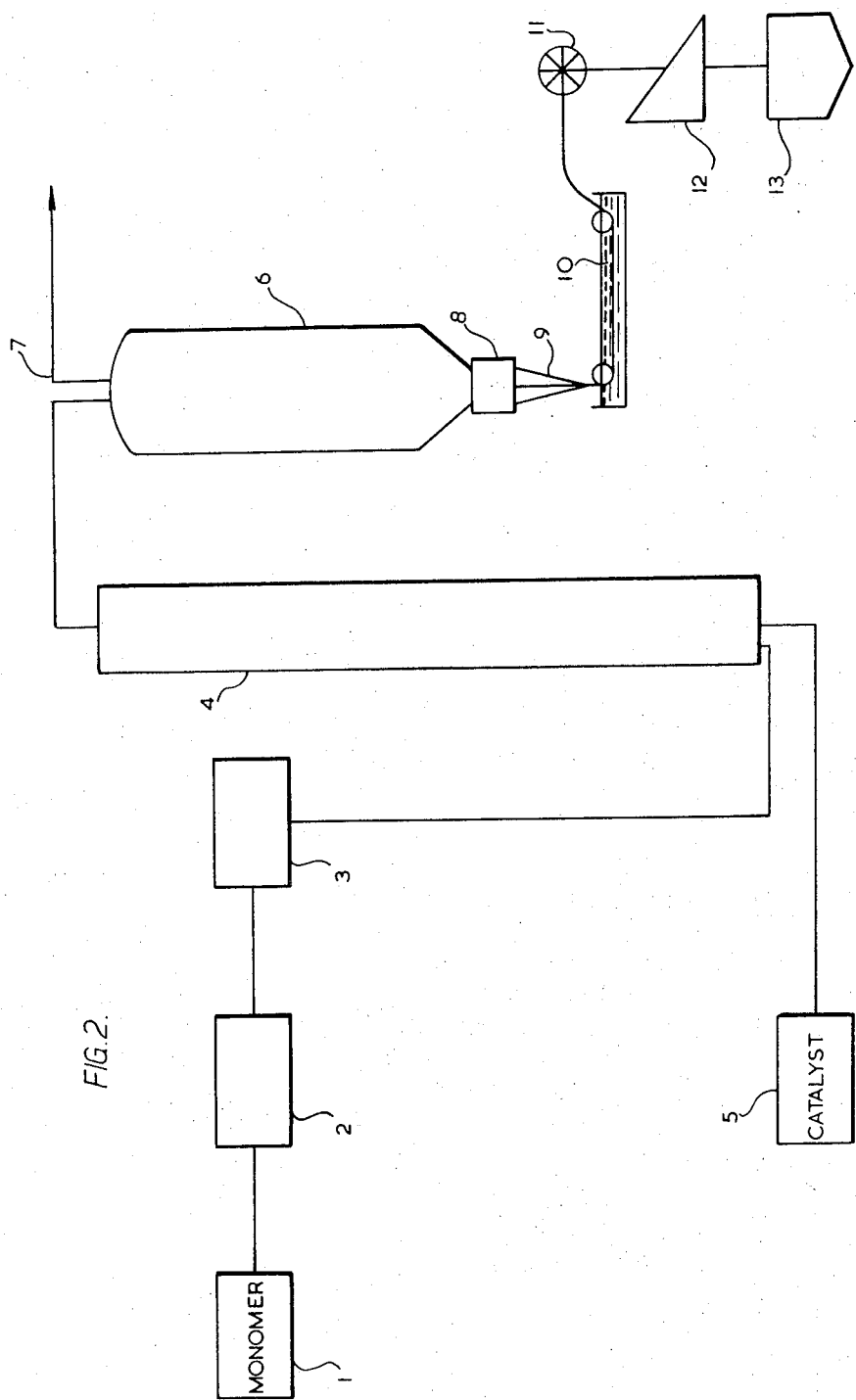

The polymerization reaction is conveniently carried out as a continuous process, for example in a tube reactor such as an insulated pipe. However a batch process may be used and any pressure vessel in which the heat of polymerization can be readily retained may be employed. Preferably a pressure is applied to the reaction system such that all reactants remain in the liquid phase, e.g. a pressure of at least 50 pounds per square inch (p.s.i.g.), typically 100 to 200 p.s.i.g. If desired some proportion of the vapor, especially of hydrocarbons other than monomer, may be removed from the reaction system. A continuous process is preferred and one suitable form of apparatus for carrying out such a process is illustrated in FIG. 2 of the accompanying drawings. A source 1 of vinyl aromatic compound, e.g. styrene, namely the effluent of a dehydrogenation reaction which produces the vinyl aromatic compound from a precursor thereof, is connected to a drier 2 leading to a preheater 3. In the preheater the feedstock is heated to the required initiation temperature before passing to the base of an upright tube reactor 4, though it will be appreciated that this step may not always be required.

Catalyst, e.g. in solution, which is kept under a blanket of, e.g. nitrogen, in a tank 5 is also passed to the base of the reactor. The wholly anionic polymerization proceeds uninterruptedly as the monomer and catalyst pass up the reactor, at a rate of for example one foot per minute, the temperature of the reaction mixture being monitored if desired at suitable points. The reaction mixture is passed from the top of the reactor to a heated devolatilizer 6 wherein unreactive hydrocarbons present and any unreacted monomer(s) are removed under vacuum for recycling through an outlet 7. The molten polymer product which is recovered is passed through a pump extruder 8 where it is formed into a plurality of strands 9. These strands are taken through a water cooling bath 10 to a pelletizer 11 where they cut into nibs or granules. These are sieved in a sieve 12 and finally passed to a storage hopper 13.

Fillers, reinforcing agents and/or lubrication aids may be included. For example an unsaturated rubber such as polybutadiene and/or natural rubber or similar polymers, desirably in solution in a suitable solvent may be admixed with the monomer feed.

A preferred embodiment in accordance with the present invention will now be described by way of example.

EXAMPLE

Using the apparatus described above, a 40% solution (by weight) of styrene in ethyl benzene constituted by the effluent emanating from the dehydrogenation reaction of ethyl benzene, was dried over alumina and preheated to approximately 60° C. before passing it to a lagged 22 ft., 4 inch diameter vertical tube reactor. At the point where the solution entered the reactor a 15% w./w. solution of lithium butyl in hexane was injected at the rate of 0.066 parts of lithium butyl per hundred parts of styrene (on a weight basis). Separate exeperiments indicated that approximately 0.043 parts per hundred parts of styrene were present as the active catalyst. The mixture was maintained under a pressure of 150 p.s.i.g. As the mixture rose up the reactor, polymerization took place, the strong exothermic reaction causing the mixture temperature to rise. The residence time was approximately 30 minutes and the final temperature approximately 190° C. The conversion of styrene to polystyrene was approximately 96%. The mixture was passed to a devolatilizer where under a high vacuum and at 240° C. the residual styrene and ethyl benzene were removed. The molten polystyrene was removed by a pump and forced through an extrusion head and recovered.

The inherent viscosity of the product was 0.89. Other physical properties were measured and are given in the following Table.

Taking the heat of polymerization of styrene as 16.7 kilocalories per mole and the specific heat of the mixture (assumed to be constant at all temperatures) as 0.5, the theoretical temperature rise can be calculated to be 128° C. The observed temperature rise was 130° C. and thus it can be seen that substantially all the heat of polymerization was retained in the reaction mixture, i.e. the reaction was performed under substantially adiabatic conditions.

TABLE

| | Test method | Test conditions | Result |
|---|---|---|---|
| Tensile strength | A.S.T.M. D.638-67T | Type 1 C.H.S., 0.5 cm./min | 592 kg./cm.² |
| Elongation | A.S.T.M. D.638-67T | | 5.3% |
| Flexural yield strength | A.S.T.M. D.790-66 | ½″ x ½″ x 5″ bar C.H.S., 0.5 cm./min | 1,100 kg./cm.² |
| Notched impact strength | A.S.T.M. D.256-56 (1961) | ½″ x ½″ x 2½″ bar, 25° C | 2.29 kg./cm./cm. |
| Flexural modulus | A.S.T.M. D.790-66 | ½″ x ½″ bar | 4.44 ×10⁴ kg./cm.² |
| Rockwell Hardness | A.S.T.M. D.785-65 | R & M scale ⅛″ disc, 25° C | R 115 M 70. |
| Heat distortion temperature | A.S.T.M. D.648-56 (1961) | 66 p.s.i | 94.5° C |
| Melt flow index | A.S.T.M. D.1238-65T | 190° C./5 kg | 1.49 g./10 min. |

What is claimed is:

1. A process for the manufacture of polystyrene having an inherent viscosity of at least 0.5 from the hydrocarbon effluent obtained by the dehydrogenation of ethyl benzene, said effluent containing 30% to 60% by weight of styrene, comprising polymerizing the styrene with a catalyst consisting essentially of a lithium alkyl and retaining in the reaction mixture at least 50% of the heat of polymerization whereby the temperature of the mixture is caused to rise and is in excess of 100° C. for at least half the reaction time.

2. A process according to claim 1 wherein at least 80% of the heat of polymerization is retained in the reaction mixture.

3. A process according to claim 1 wherein the reaction is performed under substantially adiabatic conditions.

4. A process according to claim 1 wherein the temperature of the reaction mixture is in excess of 100° C. for at least half the time of the reaction.

5. A process according to claim 1 wherein the amount of active catalyst is 5 to 15 millimoles per litre of vinyl aromatic monomer.

6. A process according to claim 1 wherein styrene is polymerized substantially in the form of the effluent of the dehydrogenation of ethyl benzene.

7. A process according to claim 1 wherein the polymerization reaction time is less than 1 hour.

8. A process according to claim 7 wherein the polymerization reaction time is 30 minutes or less.

9. A process according to claim 1 wherein the inherent viscosity is from 0.65 to 1.4.

10. A process according to claim 1 wherein the temperature of the reaction mixture at initiation of polymerization is in the range 40° to 90° C.

11. A process according to claim 1 wherein the rise in temperature of the reaction mixture is at least 100° C.

12. A process according to claim 1 wherein the conversion of monomer(s) to polymer is at least 80%.

13. A process according to claim 1 wherein the active catalyst concentration and the temperature of the reaction mixture at initiation are within the area ABC shown in FIG. 1 of the accompanying drawings.

14. A process according to claim 1 wherein the active catalyst concentration and the temperature of the reaction mixture at initiation are within the area DEFGH shown in FIG. 1 of the accompanying drawings.

15. A process according to claim 1 wherein the process is continuous.

16. A process according to claim 15 wherein the process is carried out in one or more thermally insulated tube reactors.

17. A process for the manufacture of polystyrene according to claim 1 wherein the hydrocarbon effluent is continuously supplied to the base of a tubular reactor, the lithium alkyl is injected into the reaction mixture at said base and the polystyrene product is recovered at a temperature of at least 180° C. at the top of said reactor.

18. A process according to claim 17 wherein the polymerization reaction time is less than 1 hour.

19. A process according to claim 17 wherein the conversion of monomer to polymer is at least 80%.

20. A process according to claim 1 wherein the amount of lithium butyl active in the polymerization is 0.035 to 0.075 parts by weight per hundred parts by weight of styrene.

21. A process for the anionic polymerization of at least one vinyl aromatic monomer selected from styrene and hydrocarbyl substituted styrenes comprising polymerizing the monomer in the presence of a catalyst consisting essentially of lithium or a hydride or hydrocarbyl thereof characterized in that the feedstock for the polymerization is the hydrocarbon effluent obtained by the dehydrogenation of a hydrocarbon stream comprising the alkyl benzene precursor of the vinyl aromatic monomer, said feedstock comprising 30 to 60% by weight of said monomer and in that at least 50% of the heat of polymerization is retained in the reaction mixture whereby the temperature of the mixture is caused to rise and is for at least part of the reaction time in excess of 100° C. and maintaining the reaction conditions such that the inherent viscosity of the polymer product after recovery is at least 0.5.

22. A process according to claim 21 wherein the catalyst is lithium metal, or a lithium alkyl, aryl, or aralkyl.

23. A process according to claim 21 wherein the catalyst is lithium butyl.

24. A process according to claim 21 wherein the feedstock consists essentially of ethyl benzene or isopropyl benzene.

References Cited

UNITED STATES PATENTS

| | | | |
|---|---|---|---|
| 2,813,137 | 11/1957 | Twaddle | 260—93.5 |
| 3,110,706 | 11/1963 | Vollmert | 260—94.2 |
| 3,248,377 | 4/1966 | Arnold | 260—93.5 |
| 3,560,469 | 2/1971 | Plepys et al. | 260—93.5 |

JAMES A. SEIDLECK, Primary Examiner

U.S. Cl. X.R.

260—4 AR, 88.2 C, 880 R